Patented June 27, 1933

1,915,584

UNITED STATES PATENT OFFICE

BALTZAR CARL von PLATEN AND CARL GEORG MUNTERS, OF STOCKHOLM, SWEDEN, ASSIGNORS TO ELECTROLUX SERVEL CORPORATION, OF NEW YORK, N. Y., A CORPORATION OF DELAWARE

REFRIGERATION

No Drawing. Application filed May 18, 1928, Serial No. 278,904, and in Sweden March 3, 1923.

This application is to be considered as relating back, for common subject matter, to our co-pending application Serial No. 691,477, filed February 8, 1924, and to the rights incident thereto.

The invention relates to compositions of matter and consists in a new fluid content for a refrigerating system. The fluid content comprises three or more substances cooperating as a group. The basic substance is monomethylamine $CH_3NH_2$. Together therewith, the group includes a solvent for the monomethylamine and a fluid into which the monomethylamine is adapted to diffuse but which is not a solvent for the monomethylamine. This may be hydrogen if the diffusion agency is gaseous throughout its cycle of the refrigeration system or it may be isobutane if the diffusion agency is liquid in part of the system. The auxiliary agent into which the monomethylamine diffuses and the solvent preferably have a common element such as hydrogen therewith. The solvent is preferably water.

The system of refrigeration for using these substances may be that of our Patent No. 1,609,334 granted December 7, 1926. We have used substances of this character in the apparatus shown in Fig. 2 of that patent and they have given excellent results with advantages over refrigeration compositions previously used.

As advantages, monomethylamine has an appreciably lower boiling point than ammonia for operating temperatures. Ammonia having been the only previously successful refrigerant so far as we know in systems employing three or more fluids. Comparison with ammonia is comparison with the prior art. Besides this, monomethylamine has much greater solubility in water and other absorption liquids than ammonia. With relation to the third substance used, monomethylamine is made up in part of hydrogen which when cooperating with two or more other substances embodying hydrogen has a component part giving a stabilized fluid group. The lower vapor pressure makes it possible to have a lower total pressure within the refrigerating apparatus. The greater solubility reduces rectifier losses and increases efficiency due to the smaller relative amount of absorption liquid required.

The chemical relation thus possible with the absorption liquid and other substances, such as hydrogen, prevents disassociation of the fluids within the group.

Thus there is a suitable relation with the elements and a cooperation between the three which gives distinct advantages for a refrigeration system employing at least three fluids.

It will be understood that the auxiliary fluid is inert with respect to both the refrigerant proper and the solvent therefor. For example, hydrogen is inert with respect to monomethylamine and water and is not soluble in the water.

While an absorption liquid and hydrogen and isobutane as an auxiliary substance have been specified for use with monomethylamine, it will be evident that other substances may be used so long as they have the cooperating characteristics above specified and as set out in the appended claims.

Having thus described our invention, what we claim is:

1. As a material for refrigeration the group of cooperating substances consisting of monomethylamine, water and hydrogen.

2. A group of cooperating substances for refrigeration consisting of monomethylamine, a solvent therefor, and an auxiliary gas which is inert with respect to monomethylamine and which has a common chemical constituent with monomethylamine and the solvent.

3. A group of cooperating substances for refrigeration consisting of monomethylamine, hydrogen and a solvent for the monomethylamine substantially incapable of dissolving the hydrogen.

4. A group of cooperating substances for refrigeration consisting of monomethylamine, a solvent therefor and an auxiliary agent which is inert with respect to monomethylamine and which has a common chemical constituent with monomethylamine and the solvent.

5. A group of cooperating substances for refrigeration consisting of monomethylamine, an auxiliary agent and a solvent for the monomethylamine substantially incapable of dissolving the auxiliary agent.

In testimony whereof we have hereunto affixed our signatures.

BALTZAR CARL von PLATEN.
CARL GEORG MUNTERS.